United States Patent
Brown et al.

(10) Patent No.: US 10,943,146 B2
(45) Date of Patent: *Mar. 9, 2021

(54) CLUSTERING HISTORICAL IMAGES USING A CONVOLUTIONAL NEURAL NET AND LABELED DATA BOOTSTRAPPING

(71) Applicant: Ancestry.com Operations Inc., Lehi, UT (US)

(72) Inventors: Laryn Brown, Highland, UT (US); Michael Murdock, Lehi, UT (US); Jack Reese, Lindon, UT (US); Shawn Reid, Orem, UT (US)

(73) Assignee: ANCESTRY.COM OPERATIONS INC., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,114

(22) Filed: Apr. 29, 2019

(65) Prior Publication Data
US 2019/0251392 A1    Aug. 15, 2019

Related U.S. Application Data

(63) Continuation of application No. 15/393,008, filed on Dec. 28, 2016, now Pat. No. 10,318,846.

(51) Int. Cl.
*G06K 9/62* (2006.01)

(52) U.S. Cl.
CPC .................. *G06K 9/6254* (2013.01)

(58) Field of Classification Search
None
See application file for complete search history.

(56) References Cited

U.S. PATENT DOCUMENTS

| 7,151,852 B2 * | 12/2006 | Gong | G06K 9/00711 382/173 |
| 7,436,994 B2 * | 10/2008 | Huang | G06K 9/00456 382/156 |

(Continued)

OTHER PUBLICATIONS

Längkvist, Martin, et al. "Interactive learning with convolutional neural networks for image labeling." International Joint Conference on Artificial Intelligence (IJCAI), New York, USA, Jul. 9-15, 2016. 2016. (Year: 2016).*

(Continued)

*Primary Examiner* — Andrae S Allison
(74) *Attorney, Agent, or Firm* — Kilpatrick Townsend & Stockton LLP

(57) ABSTRACT

Systems and methods for classifying historical images. A feature extractor may create feature vectors corresponding to a plurality of images. A first classification of the plurality of images may be performed based on the plurality of feature vectors, which may include assigning a label to each of the plurality of images and assigning a probability for each of the assigned labels. The assigned probability for each of the assigned labels may be related to a statistical confidence that a particular assigned label is correctly assigned to a particular image. A subset of the plurality of images may be displayed to a display device. An input corresponding to replacement of an incorrect label with a corrected label for a certain image may be received from a user. A second classification of the plurality of images based on the input from the user may be performed.

7 Claims, 6 Drawing Sheets

(56) References Cited

U.S. PATENT DOCUMENTS

| | | | | |
|---|---|---|---|---|
| 7,702,145 B2* | 4/2010 | Revow | ............... | G06K 9/6255 |
| | | | | 382/156 |
| 8,548,260 B2* | 10/2013 | Okada | ............... | G06K 9/6282 |
| | | | | 382/226 |
| 9,501,724 B1* | 11/2016 | Yang | ............... | G06K 9/6828 |
| 9,781,575 B1* | 10/2017 | Wan | ............... | H04W 4/70 |
| 10,318,846 B2* | 6/2019 | Brown | ............... | G06K 9/6254 |
| 2004/0252888 A1* | 12/2004 | Bargeron | ............... | G06F 17/242 |
| | | | | 382/188 |
| 2008/0130997 A1* | 6/2008 | Huang | ............... | G06K 9/3266 |
| | | | | 382/181 |
| 2010/0220922 A1* | 9/2010 | Okada | ............... | G06K 9/00375 |
| | | | | 382/159 |
| 2010/0226564 A1* | 9/2010 | Marchesotti | ............... | G06K 9/4671 |
| | | | | 382/159 |
| 2017/0109427 A1* | 4/2017 | Izumi | ............... | G06K 9/6272 |

OTHER PUBLICATIONS

Kim, Been. Interactive and interpretable machine learning models for human machine collaboration. Diss. Massachusetts Institute of Technology, 2015. (Year: 2015).*

* cited by examiner

CLUSTERING HISTORICAL IMAGES USING A CONVOLUTIONAL NEURAL NET AND LABELED DATA BOOTSTRAPPING

CROSS REFERENCES TO RELATED APPLICATIONS

This application is a continuation of U.S. Nonprovisional application Ser. No. 15/393,008 entitled "Clustering Historical Images Using a Convolutional Neural Net and Labeled Data Bootstrapping," filed Dec. 28, 2016, which is expressly incorporated by reference in its entirety for all purposes as if fully set forth herein.

BACKGROUND OF THE INVENTION

The genealogical and historical documents communities presently use manual labor to cluster historical images. The clustering (or classifying) of historical images includes applying labels to images with similar content, such as applying a label of "census" to all images of census records, or applying a label of "gravestone" to all images depicting a gravestone. Labels may vary over a wide range of specificity, from relatively generic labels (e.g., "photo") to more specific labels (e.g., "photo of woman holding baby"). Because genealogical databases often contain huge amounts of historical documents (on the order of billions), new approaches for clustering and classifying historical images are needed.

BRIEF SUMMARY OF THE INVENTION

A method for classifying a plurality of images is provided. The method may include creating, by a feature extractor, a plurality of feature vectors corresponding to the plurality of images. The method may include performing a first classification of the plurality of images based on the plurality of feature vectors. Performing the first classification may include assigning at least one of a plurality of labels to each of the plurality of images and assigning a first probability for each of the assigned labels. The assigned first probability for each of the assigned labels may be related to a statistical confidence that a particular assigned label is correctly assigned to a particular image. The method may include determining a subset of probabilities of the assigned first probabilities. The method may include determining a subset of the plurality of images corresponding to the subset of probabilities. The method may include outputting, to a display device, the subset of the plurality of images corresponding to the subset of probabilities. The method may include receiving user input corresponding to replacement of an incorrect label with a corrected label for a certain image of the subset of the plurality of images. The method may include performing a second classification of the plurality of images based on the plurality of feature vectors. Performing the second classification may include assigning at least one of the plurality of labels to each of the plurality of images including assigning the corrected label to the certain image and assigning a second probability for each of the assigned labels.

In some embodiments, the feature extractor is a convolutional neural network (CNN). In some embodiments, the CNN may have been previously trained and the CNN may be compatible with the plurality of images such that the plurality of images are receivable as inputs by the CNN. In some embodiments, the plurality of images may be historical images. In some embodiments, the method may include determining a second subset of probabilities of the assigned second probabilities. In some embodiments, the method may include determining a second subset of the plurality of images corresponding to the second subset of probabilities. In some embodiments, the method may include outputting, to a display device, the second subset of the plurality of images. In some embodiments, the method may include receiving user input corresponding to replacement of a second incorrect label with a second corrected label for a second certain image of the second subset of the plurality of images. In some embodiments, each of the plurality of feature vectors comprise 4096 numbers.

In some embodiments, the subset of probabilities of the assigned first probabilities may include one of the following: all assigned first probabilities that are less than a probability threshold, all assigned first probabilities that are between a lower probability threshold and an upper probability threshold, one or more first probabilities that are below an average probability of the assigned first probabilities, and one or more first probabilities that are below a median probability of the assigned first probabilities. In some embodiments, the method may include receiving user input corresponding to creation of a new label. In some embodiments, the new label may be added to the plurality of labels.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the present disclosure relate to classification of historical images using several approaches. In a first approach, a Convolutional Neural Network (CNN) is trained on millions of labeled historical documents so that the CNN can be reused on other documents to classify and cluster them into groups. Although there are currently CNN models available that are trained on photographs (e.g., ImageNet), these models have limited capabilities in dealing with historical documents and often produce poor results. In a second approach, an already existing CNN model that has been previously trained for classifying non-historical images is used to classify historical images. The already existing CNN is used in conjunction with a feature classifier that is iteratively trained by manually labeling a small number of historical images (generally less than 100). The small number of historical images that are manually labeled are used to "bootstrap" the training of the feature classifier.

In a third approach, a CNN is trained on labeled historical documents and then is used in conjunction with a feature classifier that is iteratively trained by manually labeling a small number of historical images from the domain of a single project. Similar to the second approach, the small number of historical images that are manually labeled are used to "bootstrap" the training of the feature classifier. These three approaches to classifying historical images each offer advantages and disadvantages. The first approach and the third approach may achieve more accurate labeling results than the second approach, however the associated time and cost of manually labeling millions of historical documents may be prohibitive. The second approach may achieve slightly less accurate labeling results in certain circumstances, but is faster and much less expensive than the first approach. Various embodiments related to these approaches are described below in reference to FIGS. 1-5.

Figure 1:
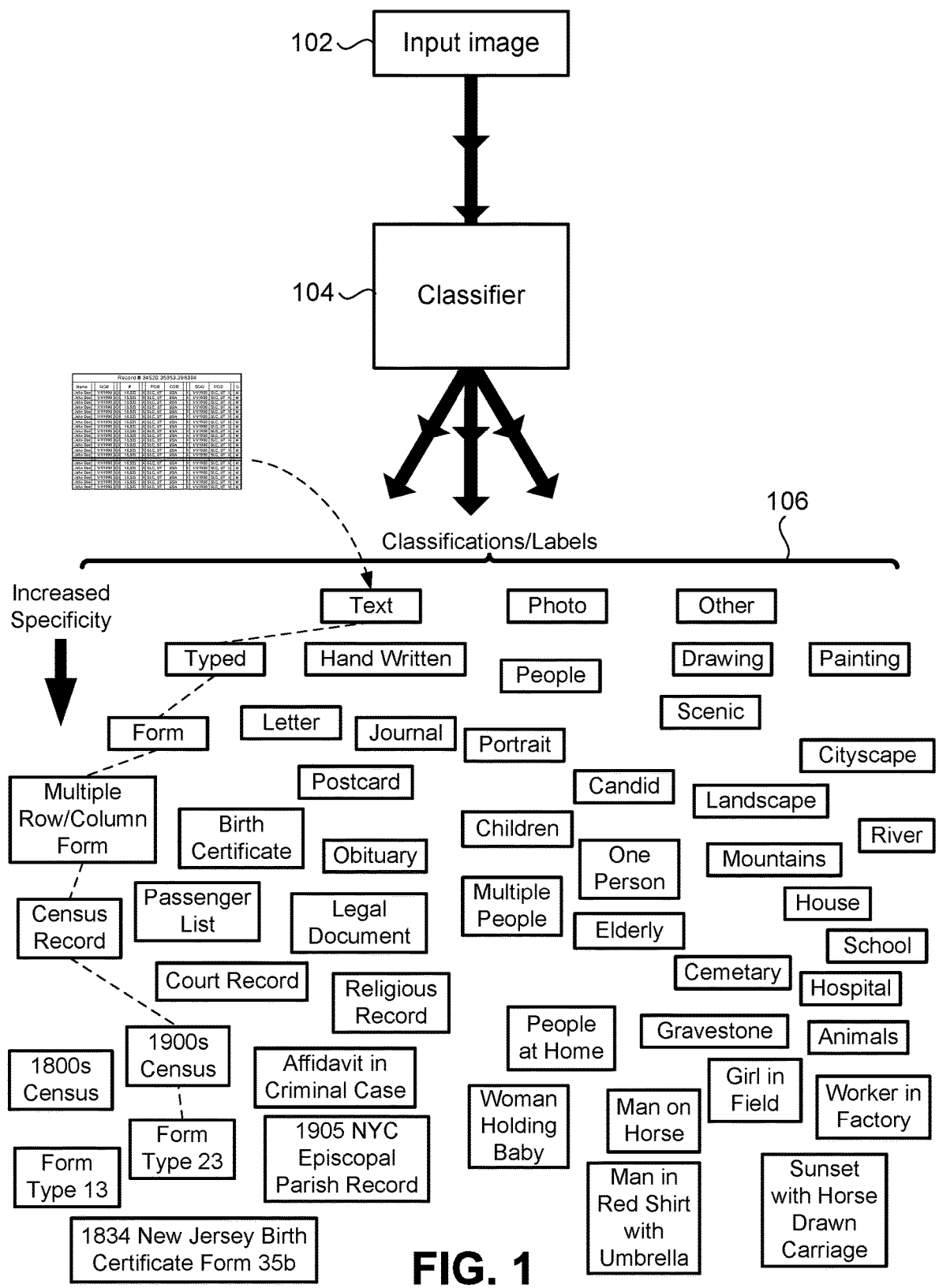
FIG. 1 illustrates an image classification process in which a classifier assigns a label to an input image, according to an embodiment of the present disclosure.

FIG. 1 illustrates an image classification process in which a classifier 104 assigns a label 106 to an input image 102, according to an embodiment of the present disclosure. Possible labels vary over a wide range of specificity. The classifier 104 may assign several labels to each input image 102 or may apply a single most relevant label 106. In the example shown in FIG. 1, the classifier 104 may assign the following labels to the historical image shown: "text", "typed", "form", "multiple row/column form", "census record", "1900s census", and "form type 23". In some embodiments, the classifier 104 assigns only the most relevant label 106 to the input image 102, or the label 106 in which the classifier 104 has the most confidence (e.g., "census record").

Figure 2:
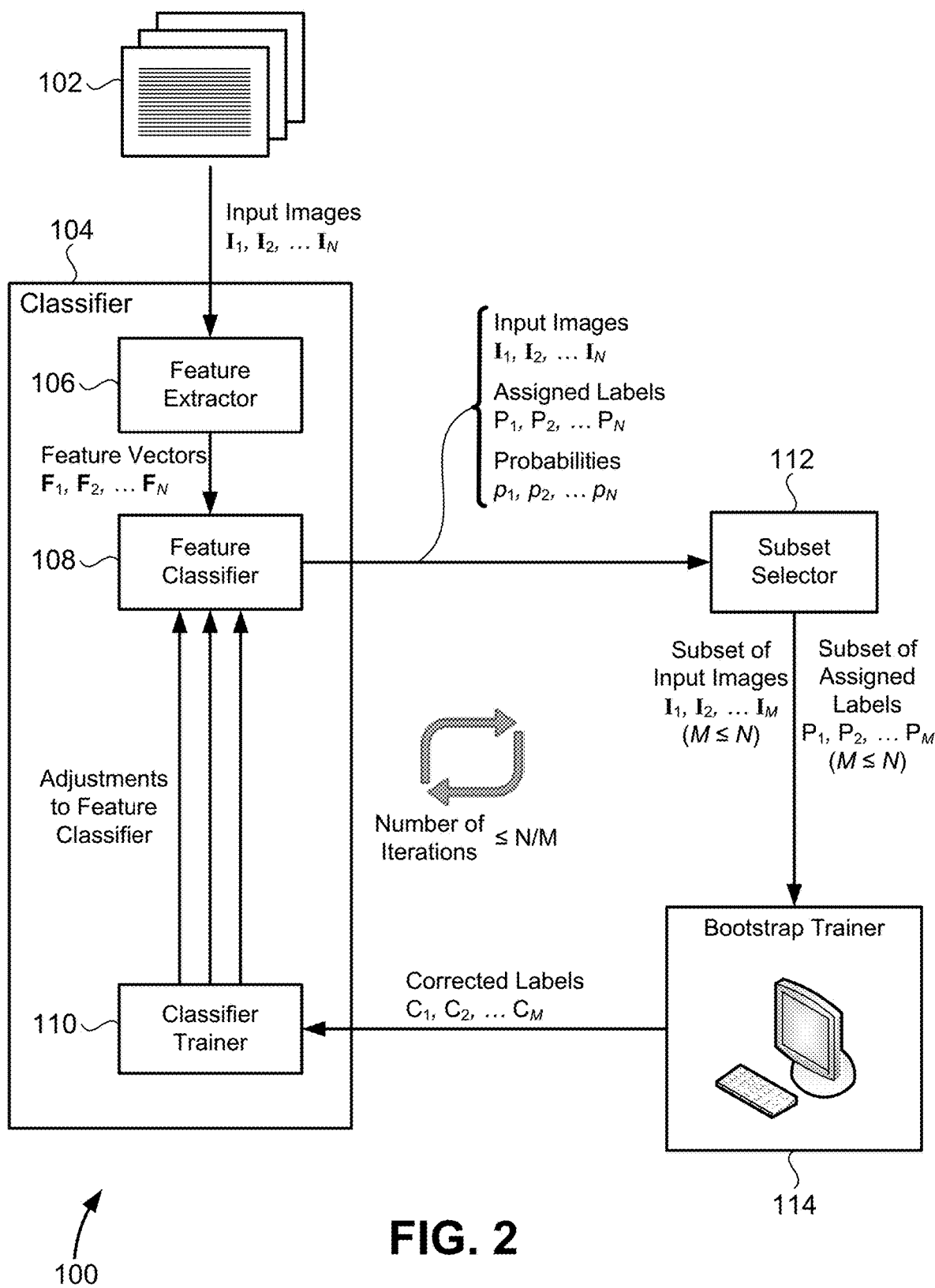
FIG. 2 illustrates an iterative image classification system, according to an embodiment of the present disclosure.

FIG. 2 illustrates an iterative image classification system 100, according to an embodiment of the present disclosure. In some embodiments, input images $I_1, I_2, \ldots I_N$ serve as inputs to the classifier 104, where N is the number of input images. The input images $I_1, I_2, \ldots I_N$ may be pixel images or vector images, among other types of image representations. For example, the input images $I_1, I_2, \ldots I_N$ may be 4000×3000 pixel images over three channels (for RGB color space).

In some embodiments, the classifier 104 includes three main components: a feature extractor 106, a feature classifier 108, and a classifier trainer 110. In some embodiments, these components may be combined into fewer components (e.g., two or one) or may be expanded into more components. The feature extractor 106 receives the input images $I_1, I_2, \ldots I_N$ and creates feature vectors $F_1, F_2, \ldots F_N$ which are alternative representations for each of the input images $I_1, I_2, \ldots I_N$ related to the features of the images. In some embodiments, the feature extractor 106 is a CNN that has been previously trained for classifying non-historical images such that the CNN is compatible with images. For example, the feature extractor 106 may be the CNN associated with the image database ImageNet. In some embodiments, each of the feature vectors $F_1, F_2, \ldots F_N$ includes a vector of 4096 numbers related to the features of the input images $I_1, I_2, \ldots I_N$.

In some embodiments, the feature classifier 108 receives the feature vectors $F_1, F_2, \ldots F_N$ and performs a first classification by assigning labels $P_1, P_2, \ldots P_N$ to the feature vectors $F_1, F_2, \ldots F_N$ and to their corresponding input images $I_1, I_2, \ldots I_N$. The feature classifier 108 may also assign probabilities $p_1, p_2, \ldots p_N$ for the assigned labels $P_1, P_2, \ldots P_N$ related to the statistical confidence the feature classifier 108 has that the assigned label is correctly assigned to a particular image. For example, if the feature classifier 108 has a high confidence that label $P_1$ should be assigned to feature vector $F_1$ and to its corresponding input image $I_1$, then the assigned probability may be $p_1=0.96$. Alternatively, if the feature classifier 108 has a low confidence that label $P_2$ should be assigned to feature vector $F_2$ and to its corresponding input image $I_2$, then the assigned probability may be $p_2=0.04$.

In some embodiments, the iterative image classification system 100 includes a subset selector 112 for filtering (or selecting) the input images $I_1, I_2, \ldots I_N$, the assigned labels $P_1, P_2, \ldots P_N$, and the probabilities $p_1, p_2, \ldots p_N$ to create a subset of input images $I_1, I_2, \ldots I_M$, a subset of assigned labels $P_1, P_2, \ldots P_M$, and a subset of probabilities $p_1, p_2, \ldots p_M$, where M≤N (M=N corresponding to the case where the subset selector 112 does nothing). The main purpose of the subset selector 112 is to feed the bootstrap trainer 114 with a set of images that is small enough to be feasible for a limited number of users to manually label in a short amount of time yet large enough for the iterative image classification system 100 to make a meaningful improvement in accuracy over each iteration.

In some embodiments, the subset selector 112 determines the subset of input images $I_1, I_2, \ldots I_M$ based on which of the input images $I_1, I_2, \ldots I_N$ have the lowest corresponding probabilities $p_1, p_2, \ldots p_N$. For example, if N=10, M=3, and $p_1=0.1$, $p_2=0.2$, $p_3=0.3$, $p_4=0.4$, $p_5=0.5$, $p_6=0.6$, $p_7=0.7$, $p_8=0.8$, $p_9=0.9$, $p_{10}=1.0$, then the subset of input images $I_1, I_2, \ldots I_M$ would be the images corresponding to $p_1, p_2,$ and $p_3$. In some embodiments, the subset selector 112 determines the subset of input images $I_1, I_2, \ldots I_M$ based on which of the input images $I_1, I_2, \ldots I_N$ have a corresponding probability $p_1, p_2, \ldots p_N$ below a probability threshold. For example, if N=10, M=variable, $p_{threshold}=0.45$, and $p_1=0.1$, $p_2=0.2$, $p_3=0.3$, $p_4=0.4$, $p_5=0.5$, $p_6=0.6$, $p_7=0.7$, $p_8=0.8$, $p_9=0.9$, $p_{10}=1.0$, then the subset of input images $I_1, I_2, \ldots I_M$ would be the images corresponding to $p_1, p_2, p_3,$ and $p_4$.

In some embodiments, the subset selector 112 determines the subset of input images $I_1, I_2, \ldots I_M$ based on which of the input images $I_1, I_2, \ldots I_N$ have a corresponding probability $p_1, p_2, \ldots p_N$ between a lower probability threshold and an upper probability threshold. For example, if N=10, M=variable, $p_{l\_threshold}=0.15$, $p_{u\_threshold}=0.55$, and $p_1=0.1$, $p_2=0.2$, $p_3=0.3$, $p_4=0.4$, $p_5=0.5$, $p_6=0.6$, $p_7=0.7$, $p_8=0.8$, $p_9=0.9$, $p_{10}=1.0$, then the subset of input images $I_1, I_2, \ldots I_M$ would be the images corresponding to $p_2, p_3, p_4,$ and $p_5$. In some embodiments, the subset selector 112 determines the subset of input images $I_1, I_2, \ldots I_M$ based on which of the input images $I_1, I_2, \ldots I_N$ have a corresponding probability $p_1, p_2, \ldots p_N$ below an average probability. For example, if N=10, M=variable, and $p_1=0.1$, $p_2=0.2$, $p_3=0.3$, $p_4=0.4$, $p_5=0.5$, $p_6=0.6$, $p_7=0.7$, $p_8=0.8$, $p_9=0.9$, $p_{10}=1.0$, then the subset of input images $I_1, I_2, \ldots I_M$ would be the images corresponding to $p_1, p_2, p_3, p_4,$ and $p_5$ (average probability is 0.55).

In some embodiments, the bootstrap trainer 114 is a computer system, a software program, and/or a user interface that allows a human user to review the subset of assigned labels $P_1, P_2, \ldots P_M$ and create corrected labels $C_1, C_2, \ldots C_M$. For example, the bootstrap trainer 114 may include a human user looking at a computer display showing the subset of input images $I_1, I_2, \ldots I_M$ and the subset of assigned labels $P_1, P_2, \ldots P_M$. The human user may review each of the images and labels and decide to take one of several actions: accept the assigned label, reject the assigned label and assign a corrected label from an existing label, reject the assigned label and create a new label, reject the assigned label and skip, or just skip. For example, the human user may review an input image 102 of a german shepherd with a "bulldog" label. The human user may look through the currently available labels of "retriever", "beagle", "poodle", "rottweiler", and "boxer" and determine that a new label "german shepherd" is needed. The human user may create the label "german shepherd" and assign it to the image of the german shepherd. Alternatively, the user may not recognize the type of dog in the input image 102 but may know that the "bulldog" label is not correct. The user may choose to reject the assigned label and skip choosing any corrected label.

In some embodiments, the user may have an action available to him/her to choose that they are not certain whether or not an assigned label is correct. In some embodiments, a user interface may include a "skip button" that allows the user to completely skip the input image 102. As a default, the corrected labels $C_1, C_2, \ldots C_M$ for which the user chooses to skip the image may be set equal to the assigned labels $P_1, P_2, \ldots P_M$. In some embodiments, the corrected labels may instead be truncated to not include the skipped image, decreasing the length of the assigned labels $P_1, P_2, \ldots P_M$ to M−1.

After the corrected labels $C_1, C_2, \ldots C_M$ are created by the bootstrap trainer 114, they are fed into the classifier trainer 110 which makes adjustments to the feature classifier 108 so that during the next iteration the feature classifier 108 creates assigned labels $P_1, P_2, \ldots P_N$ that are consistent with the corrected labels $C_1, C_2, \ldots C_M$ of all previous iterations. In some embodiments, the adjustments to the feature classifier 108 are based on an error vector $E=\{C_1, C_2, \ldots C_M-P_1, P_2, \ldots P_M\}$ which represents the error made by the feature classifier 108 during the previous iteration. In some embodiments, the number of total iterations is less than or equal to N/M, which is the number of iterations needed for the bootstrap trainer 114 to manually label all N images. Because in most applications N is large and M is small, the number of iterations will be much less than N/M. For example, in some embodiments the classifier 104 may be trained in 1 iteration, 2 iterations, 4 iterations, 10 iterations, 100 iterations, 500 iterations, and the like. In some embodiments, the number of iterations needed is proportional to the value of N and inversely proportional to the value of M.

Figure 3:
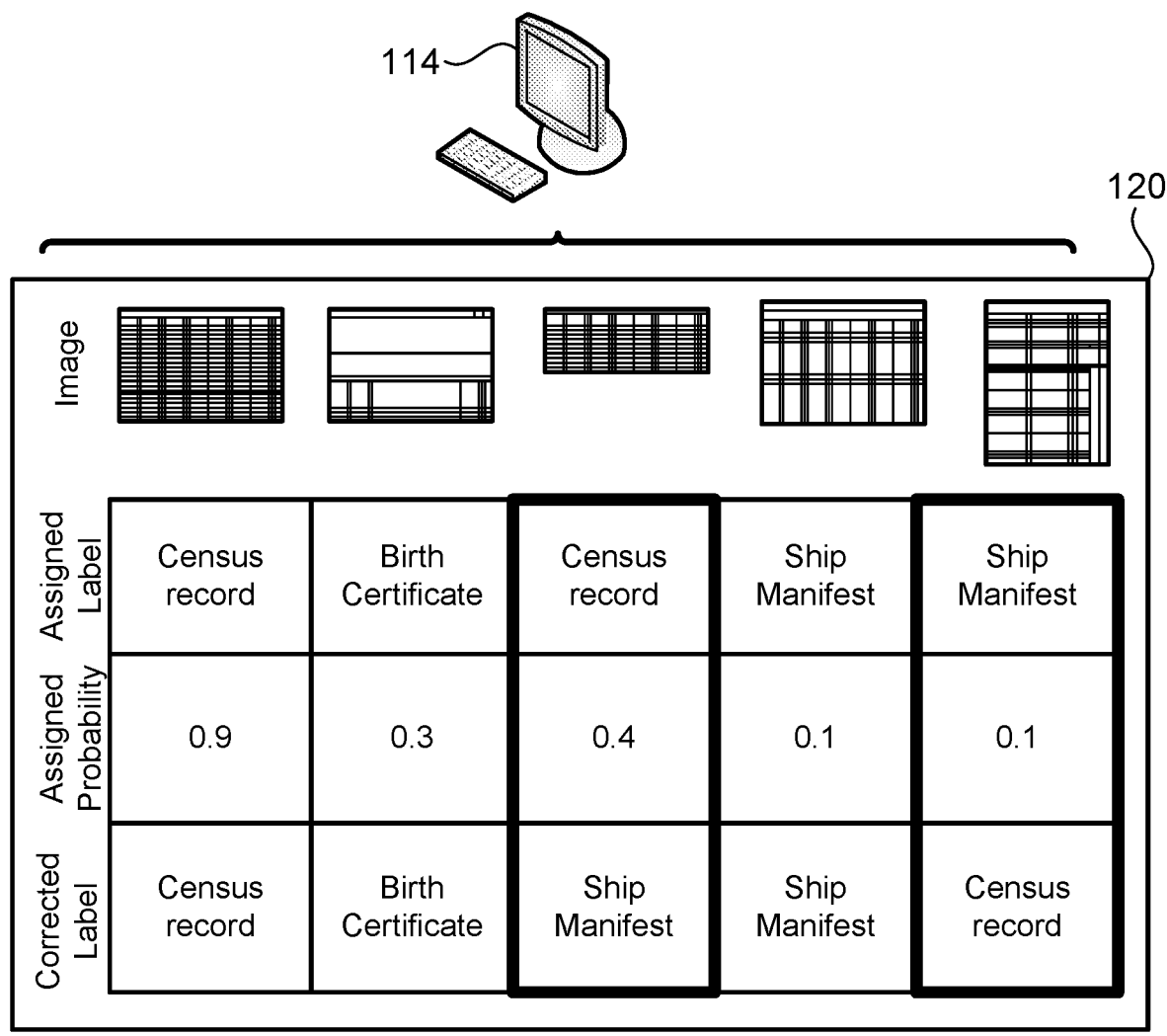
FIG. 3 illustrates an interface associated with a bootstrap trainer, according to an embodiment of the present disclosure.
Figure 4:
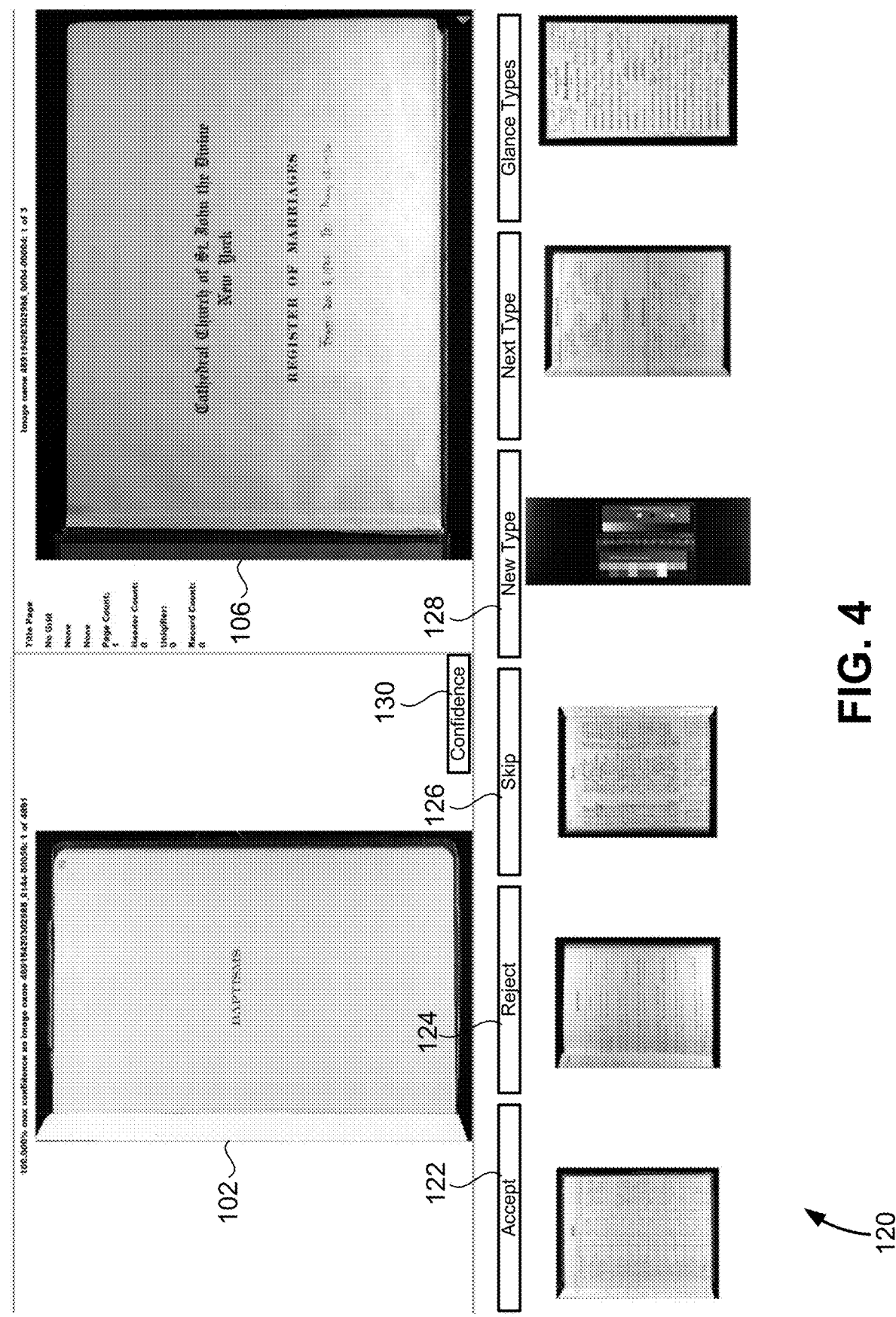
FIG. 4 illustrates an interface associated with a bootstrap trainer, according to an embodiment of the present disclosure.

FIGS. 3 and 4 illustrate possible interfaces 120 associated with the bootstrap trainer 114, according to an embodiment of the present disclosure. In reference to FIG. 3, the user is shown the contents of the top three rows of the interface 120 corresponding to the input image, the assigned label, and the assigned probability. After reviewing each input image and assigned label (and possibly the assigned probability), the user selects the corrected label row and chooses either the same label as the assigned label or a different label. Columns in which the corrected label is different from the assigned label are highlighted and flagged for use by the classifier trainer 110. In some embodiments, the human user is not shown the subset of probabilities $p_1, p_2, \ldots p_M$ so as to not bias the human user's decision making.

In reference to FIG. 4, after reviewing the input image 102 and the assigned label 106 (shown in FIG. 4 as an image), a user may choose to select an accept button 122, a reject button 124, a skip button 126, or a new type button 128. The new type button 128 may be selected when the user is unable to find a label that should be assigned to the input image 102. The accept button 122 may be selected when the user agrees that the assigned label 106 should be assigned to the input image 102. In some embodiments, due to the large number of possible labels, the interface 120 may display possible labels with the highest probability of matching with the input image 102 (shown in FIG. 4 below buttons 122, 124, 126, and 128). Sorting the possible labels accordingly prior to presentation to the user may improve labeling efficiency.

In some embodiments, the user may choose to select a confidence button 130 and specify how confident he/she is in choosing a corrected label. Corrected labels in which a user specifies a high level of confidence are given greater weight by the classifier trainer 110. In contrast, corrected labels in which a user specifies a low level of confidence are given less weight by the classifier trainer 110 and may cause the feature classifier 108 to create assigned labels $P_1, P_2, \ldots P_N$ that are inconsistent with prior corrected labels $C_1, C_2, \ldots C_M$. For example, if the user assigns the label "census record" and selects the confidence button 130 to select low confidence, the feature classifier 108 may create an assigned label during the next iteration that assigns the label "ship manifest" regardless of the previous corrected label.

Figure 5:
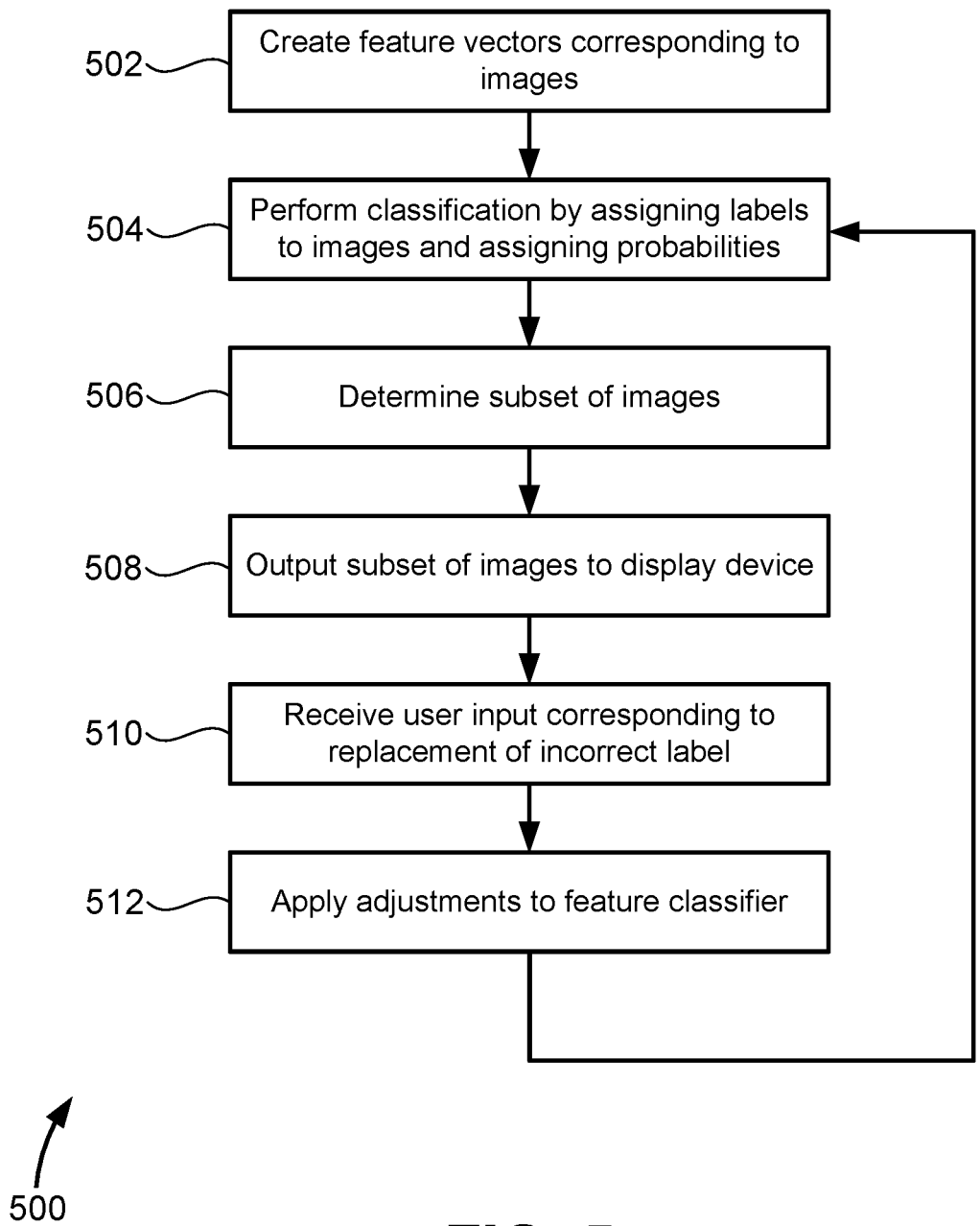
FIG. 5 illustrates a method for classifying a plurality of images, according to an embodiment of the present disclosure.

FIG. 5 illustrates a method 500 for classifying a plurality of images, according to an embodiment of the present disclosure. At step 502, feature vectors corresponding to the plurality of images are created by a feature extractor. At step 504, a classification of the plurality of images is performed based on the plurality of feature vectors. The classification includes assigning at least one of a plurality of labels to each of the plurality of images. The classification also includes assigning a probability for each of the assigned labels. At step 506, a subset of probabilities of the assigned probabilities is determined. The subset of probabilities correspond to a subset of the plurality of images. At step 508, the subset of the plurality of images is outputted to a display device for view by a user. At step 510, user input corresponding to replacement of an incorrect label with a corrected label for a certain image is received. At step 512, adjustments to the feature classifier 108 are applied. After step 512, step 504 through step 510 may be repeated one or more time until satisfactory results are obtained.

Figure 6:
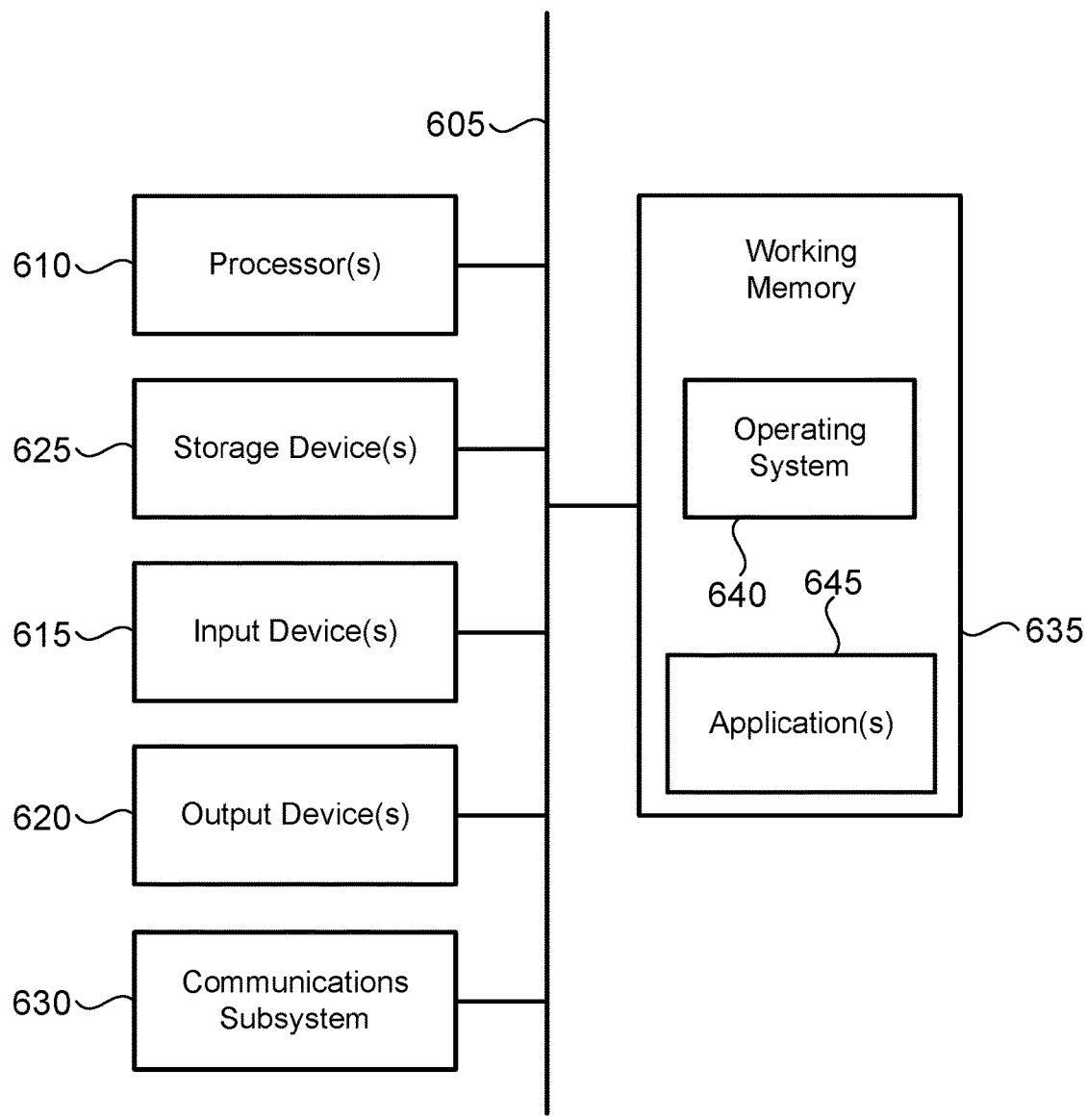
FIG. 6 illustrates a simplified computer system, according to an embodiment of the present disclosure.

FIG. 6 illustrates a simplified computer system 600, according to some embodiments of the present disclosure. A computer system 600 as illustrated in FIG. 6 may be incorporated into devices such as a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device as an input device 615. In some embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for classifying a plurality of images comprising:
    creating, by a feature extractor, a plurality of feature vectors corresponding to the plurality of images;
    performing, by a feature classifier, a first classification of the plurality of images based on the plurality of feature vectors, wherein performing the first classification includes:
        for each image of the plurality of images, assigning a label of a plurality of labels to the image as a whole based on a corresponding feature vector of the plurality of feature vectors such that the label corresponds to every pixel of the image; and
        assigning a first probability for each of the assigned labels, wherein the assigned first probability for each of the assigned labels is related to a statistical confidence that a particular assigned label is correctly assigned to a particular image;
    determining a subset of probabilities of the assigned first probabilities;
    determining a subset of the plurality of images corresponding to the subset of probabilities;
    receiving a corrected label for replacement of an incorrect label for a certain image of the subset of the plurality of images;
    receiving a confidence level associated with the corrected label;
    adjusting the feature classifier using the corrected label and the confidence level associated with the corrected label; and
    performing, by the adjusted feature classifier, a second classification of the plurality of images based on the plurality of feature vectors, wherein performing the second classification includes:
        assigning at least one of the plurality of labels to each of the plurality of images, including assigning the corrected label to the certain image; and
        assigning a second probability for each of the assigned labels.

2. The method of claim 1, wherein the feature extractor is a convolutional neural network (CNN), the CNN having been previously trained and the CNN being compatible with the plurality of images such that the plurality of images are receivable as inputs by the CNN.

3. The method of claim 1, wherein the plurality of images are historical images.

4. The method of claim 1, further comprising:
    determining a second subset of probabilities of the assigned second probabilities;
    determining a second subset of the plurality of images corresponding to the second subset of probabilities;
    receiving a second corrected label for replacement of a second incorrect label for a second certain image of the second subset of the plurality of images.

5. The method of claim 1, wherein each of the plurality of feature vectors comprise 4096 numbers.

6. The method of claim 1, wherein the subset of probabilities of the assigned first probabilities includes one of the following:
- all assigned first probabilities that are less than a probability threshold;
- all assigned first probabilities that are between a lower probability threshold and an upper probability threshold;
- one or more first probabilities that are below an average probability of the assigned first probabilities; and
- one or more first probabilities that are below a median probability of the assigned first probabilities.

7. The method of claim 1, further comprising:
receiving input for creation of a new label, wherein the new label is added to the plurality of labels.

\* \* \* \* \*